UNITED STATES PATENT OFFICE.

CONRAD VARLEY GREENWOOD, OF BLUNDELLSANDS, NEAR LIVERPOOL, ENGLAND, ASSIGNOR TO ALFRED STAMFORD WHITE, OF CHICAGO, ILLINOIS.

MANUFACTURE OF MUCILAGE OR GUM.

1,105,195.     Specification of Letters Patent.     Patented July 28, 1914.

No Drawing.     Application filed February 23, 1911. Serial No. 610,397.

*To all whom it may concern:*

Be it known that I, CONRAD VARLEY GREENWOOD, a subject of the King of Great Britain, residing at Blundellsands, near Liverpool, in the county of Lancaster, in the Kingdom of England, have invented certain new and useful Improvements in the Manufacture of a New Mucilage or Gum, of which the following is a specification.

This invention relates to a new or improved mucilage and consists in treating solutions of colloidal carbohydrates obtained from vegetable products, seeds, barks and rhizomes or extracts from any of these with tannic acid or solutions thereof or extracts containing the same whereby the resulting article is capable of being used in numerous arts in a very advantageous manner.

As is well known gummy or mucilaginous solutions result from the treatment of a number of vegetable products, seeds, barks, and rhizomes with water under various conditions of temperature and pressure. Such products are for instance obtained from the kernels of the locust bean by treatments and processes described in specifications of Patents No. 924319, Serial No. 470663 filed January 4th, 1909, and Serial No. 579137 filed August 26th, 1910, and are sold in various forms as "tragasol".

In carrying our my invention as applied to solutions of "gum tragasol", a solution of tannic acid is added in the proportion of about twice the weight of the acid to the "tragasol" solids. These two ingredients are now mixed together which causes a precipitation of the new product to take place according to the temperature of the mixture. When in a cold state the compound separates in the form of a curd, which agglomerates and shrinks, which allows of a satisfactory separation of the mother liquor. This mother liquor may be rejected, if desidable, or should it contain a sufficient proportion of tannic acid (excess) it may again be used to dissolve or dilute the precipitant in a subsequent operation. The product thus obtained is insoluble in cold water, i. e. only in suspension; on warming, however, it dissolves, in which state it is more transparent. This is one of the peculiarities of the product.

The product can be obtained in various gradations; when the tannic acid is used in the proportions indicated, or in excess, the product is easily separated; but for some processes it is preferable to employ smaller proportions of tannic acid, so as to form a compound in solution or emulsion but without complete separation, but it will be obvious that any proportions of tannic acid may be employed and also any one or other of the forms of tannic acid known to industry, according to any special properties of the compound which may be required; e. g. color.

The invention it will be seen is applicable to a large number of industries, among which I might mention the printing and finishing of vegetable or other textiles, and specially to give glazed and filled finishes, such as are required for book cloth; the dyeing of textiles in which case it is used as a thickening for the dye liquors possessing fixative properties; as tanning agents, i. e. for treating skins for the preparation of leather, and leather dressing, and owing to its colloidal nature the invention can be utilized for emulsifying oils and waxes and may therefore be used as a base for polishes, in the sizing of papers and for sizing wood surfaces as a ground for varnishes.

In connection with anilin and other colors or dyestuffs, it can be used in the production of colored lakes.

I declare that what I claim is:—

1. As a new article of manufacture, a product produced by adding tannic acid to a soluble colloidal vegetable carbohydrate, the product being characterized by being soluble in hot or warm water but insoluble in cold.

2. As a new article of manufacture, a precipitated product produced by the addition of tannic acid to a solution of a colloidal vegetable carbohydrate, the product being characterized by being soluble in hot or warm water but insoluble in cold.

3. As a new article of manufacture, a mucilaginous product produced as a precipitate from a mixture of tannic acid and a solution of a colloidal vegetable carbohydrate, said product being characterized by its insolubility in cold water and its solubility in warm water.

4. The process of manufacturing a new composition of matter soluble in hot or warm water, which consists in mixing a solution of soluble colloidal vegetable carbohydrates with tannic acid; and finally separating the precipitate produced.

5. The process of producing a new composition of matter soluble in hot or warm water, which consists in producing a soluble colloidal carbohydrate from raw vegetable matter; dissolving the same; adding tannic acid to such solution; and finally separating the composition of matter in the form of a precipitate thrown down in the solution.

6. As a new article of manufacture, a product produced by adding tannic acid to gum tragasol.

7. As a new article of manufacture, a precipitated product produced by the addition of tannic acid to a solution of gum tragasol.

8. As a new article of manufacture, a mucilaginous product produced as a precipitate from a mixture of tannic acid and a solution of gum tragasol, said product being characterized by its insolubility in cold water and its solubility in warm water.

9. The process of manufacturing a new composition of matter, which consists in mixing a solution of gum tragasol with tannic acid, and finally separating the precipitate produced.

10. The process of producing a new composition of matter, which consists in producing soluble gum tragasol from raw vegetable matter; dissolving the same, adding tannic acid to such solution, and finally separating the composition of matter in the form of a precipitate thrown down in the solution.

11. The process of manufacturing a new composition of matter, which consists in producing a solution of a colloidal carbohydrate from raw vegetable matter, treating said solution with tannic acid so as to form two phases, the first of which is a dilute aqueous phase and the second a gelatinous precipitate forming curdy masses, and finally separating the composition of matter in the form of said second phase.

12. The process of manufacturing a new composition of matter, which consists in treating a solution of a collodial vegetable carbohydrate with tannic acid so as to produce two phases, the first of which is a dilute aqueous phase and the second of which is a gelatinous precipitate occuring as curdy masses, and separating the new composition of matter as said second phase.

13. The process of producing a new composition of matter, which consists in treating a solution of a colloidal vegetable carbohydrate with an excess of tannic acid, the concentrations of the reacting substances being so chosen that a gelatinous curdy precipitate is produced which is then separated from the dilute aqueous phase.

14. The process of producing a new composition of matter, which consists in treating a solution of a colloidal vegetable carbohydrate with tannic acid in such manner as to precipitate a coherent colloidal mass, which mass, when separated from the dilute aqueous phase, possesses the property of insolubility in cold water and solubility in warm water to yield a transparent solution.

15. The process of producting a new composition of matter, which consists in treating a solution of gum tragasol with tannic acid in such manner as to precipitate a coherent colloidal mass, which mass when separated from the dilute aqueous phase, possesses the property of insolubility in cold water and solubility in warm water to yield a transparent solution.

16. A new composition of matter, which consists of a colloidal mass having the property of insolubility in cold water and solubility in warm water, said mass being produced from a solution of a colloidal vegetable carbohydrate and tannic acid, substantially as described.

In witness whereof, I have hereunto signed my name this 15th day of February 1911, in the presence of two subscribing witnesses.

CONRAD VARLEY GREENWOOD.

Witnesses:
H. S. SHOOBRIDGE,
J. McLACHLAN.